US008593449B2

(12) United States Patent
Murakami

(10) Patent No.: US 8,593,449 B2
(45) Date of Patent: Nov. 26, 2013

(54) REFERENCE VOLTAGE GENERATION CIRCUIT, POWER SOURCE DEVICE, LIQUID CRYSTAL DISPLAY DEVICE

(75) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 360 days.

(21) Appl. No.: 13/117,285

(22) Filed: May 27, 2011

(65) Prior Publication Data

US 2011/0298780 A1 Dec. 8, 2011

(30) Foreign Application Priority Data

Jun. 4, 2010 (JP) ................................ 2010-128413

(51) Int. Cl.

| | |
|---|---|
| ***G09G 3/36*** | (2006.01) |
| ***G09G 5/00*** | (2006.01) |
| ***G09G 3/10*** | (2006.01) |
| ***G06F 3/038*** | (2013.01) |
| ***G05F 3/16*** | (2006.01) |
| ***G05F 3/20*** | (2006.01) |
| ***G02F 1/1335*** | (2006.01) |

(52) U.S. Cl.
USPC ........... 345/212; 345/211; 345/101; 345/102; 315/169.1; 323/907; 323/313; 349/61

(58) Field of Classification Search
USPC ............................ 345/212; 315/169.1–169.4; 323/313–315; 349/61–72
See application file for complete search history.

(56) References Cited

U.S. PATENT DOCUMENTS

| | | | | |
|---|---|---|---|---|
| 7,705,662 | B2 * | 4/2010 | Ng et al. | 327/539 |
| 2003/0043640 | A1 * | 3/2003 | Marr et al. | 365/189.09 |
| 2006/0267915 | A1 * | 11/2006 | Moon et al. | 345/100 |
| 2007/0290979 | A1 * | 12/2007 | Lee et al. | 345/100 |
| 2008/0088562 | A1 * | 4/2008 | Park et al. | 345/92 |
| 2009/0002074 | A1 * | 1/2009 | Kushida et al. | 330/297 |
| 2010/0164466 | A1 * | 7/2010 | Jo | 323/313 |
| 2010/0309715 | A1 * | 12/2010 | Choi | 365/163 |

FOREIGN PATENT DOCUMENTS

| | | |
|---|---|---|
| JP | 2009-232550 | 10/2009 |

* cited by examiner

*Primary Examiner* — Kent Chang
*Assistant Examiner* — Nathan Brittingham
(74) *Attorney, Agent, or Firm* — Fish & Richardson P.C.

(57) ABSTRACT

A reference voltage generation circuit of the disclosure includes a first amplifier circuit and a second amplifier circuit. The first amplifier circuit includes a first input stage including two npn transistors or two NMOS transistors having base terminals or gate terminals to which a variable voltage and a predetermined lower limit voltage are inputted. A first output stage includes a pnp transistor or a PMOS transistor having an emitter terminal or a source terminal connected to an output terminal of a reference voltage. A first amplifier stage controls the first output stage for equalizing the higher one of the variable voltage and the lower limit voltage with the reference voltage. The second amplifier circuit includes a second input stage including two npn transistors or two NMOS transistors having base terminals or gate terminals to which the reference voltage and a predetermined higher limit voltage are inputted, a second output stage includes a pnp transistor or a PMOS transistor having an emitter terminal or a source terminal connected to an output terminal for the reference voltage, and a second amplifier stage to control the second output stage for equalizing the reference voltage with the higher limit voltage.

17 Claims, 5 Drawing Sheets

REFERENCE VOLTAGE GENERATION CIRCUIT, POWER SOURCE DEVICE, LIQUID CRYSTAL DISPLAY DEVICE

CROSS-REFERENCE TO RELATED APPLICATIONS

This application claims the benefit of priority of Japanese patent application No. 2010-128413(filing date: Jun. 4, 2010), which is incorporated herein by reference in its entirety.

BACKGROUND OF THE INVENTION

1. Field of the Invention

The disclosure relates to a reference voltage generation circuit to generate a reference voltage (i.e., an input variable voltage to which a higher limit value and a lower limit value are set) in response to receiving a variable voltage, and a power source device and a liquid crystal display device using the circuit.

2. Description of Related Art

FIG. 4 is a circuit diagram showing a first conventional example of a reference voltage generation circuit. A reference voltage generation circuit 70 of the first conventional example receives a temperature detection voltage VT (i.e., a voltage signal, the voltage value of which fluctuates according to temperature fluctuation) from a temperature sensor 60, and generates a reference voltage VREF by setting a higher limit voltage VH and a lower limit voltage VL to the temperature detection voltage VT (in reference to FIG. 3).

As a technique to realize the operation described above by using an analog signal, the reference voltage generation circuit 70 in accordance with the first conventional example includes a first amplifier circuit X which preferentially outputs a higher voltage between the temperature detection voltage VT and the lower limit voltage VL, and a second amplifier circuit Y which preferentially outputs a lower voltage as a reference voltage VREF between the output voltage VX provided from the first amplifier circuit X and the higher limit voltage VH.

As an input stage, the first amplifier circuit X is a construction which includes npn bipolar transistors X1 and X2, to each base terminal of which the temperature detection voltage VT and the lower limit voltage VL are inputted (i.e., the first amplifier circuit X is kind of a npn-input-type amplifier). As an input stage, the second amplifier circuit Y is a construction which includes pnp bipolar transistors Y1 and Y2, to each base terminal of which the output voltage VX and the higher limit voltage VH are inputted (i.e., the second amplifier circuit Y is kind of a pnp-input-type amplifier).

In addition, as an example of a technique related to the aforementioned conventional technique, Japanese patent publication No. 2009-232550 can be listed.

However, because the second amplifier circuit Y of pnp-input-type is used for the reference voltage generation circuit 70 of the first conventional example, at least a voltage value corresponding to the sum of the three voltage is required as a power source voltage to drive the input stage of the second amplifier circuit Y: the higher limit voltage VH applied to a base terminal of the transistor Y2, an ON threshold voltage Vf of the transistor Y2, and a drop voltage Vsat of the current source Y5 (i.e., VH+Vf+Vsat≈VH+1V). Therefore, with respect to the reference voltage generation circuit 70 of the first conventional example, a problem arises because a minimum operation voltage (i.e., a lowest value of the power source voltage required to maintain a normal operation) cannot be lowered adequately.

As shown in FIG. 5, as a technique to generate the reference voltage VREF (i.e., the temperature detection voltage VT to which the higher limit voltage VH and a lower limit voltage VL are set), a combination of buffers 91 to 93, comparators 94 to 95, a logic circuit 96 and a selector 97 which operates by digital signal, can be proposed. However, such a combination can result in an increase in circuit size or cost, as well as noise occurring during switching of the selector, deterioration of transient characteristics remains problems in addition to the aforementioned problems.

SUMMARY OF THE INVENTION

Therefore, in view of the aforementioned problems identified by the inventor of this application, a purpose of the disclosure is to provide a reference voltage generation circuit which can lower a lower operation voltage, and to provide a power source device and a liquid crystal display device using the circuit.

According to one aspect of the disclosure, a reference voltage generation circuit of the disclosure includes a first amplifier circuit and a second amplifier circuit. The first amplifier circuit includes a first input stage including two npn transistors or two NMOS transistors. A variable voltage and a predetermined lower limit voltage are inputted to base terminals or gate terminals of the transistors. The first amplifier circuit includes a first output stage including a pnp transistor or a PMOS transistor, an emitter terminal or a source terminal of the first output stage transistor is connected to an output terminal of a reference voltage. The first amplifier circuit also includes a first amplifier stage to control the first output stage for equalizing the higher one of the variable voltage and the lower limit voltage with the reference voltage. The second amplifier circuit includes a second input stage including two npn transistors or two NMOS transistors. The reference voltage and a predetermined higher limit voltage are inputted to base terminals or gate terminals of these input stage transistors. The second amplifier circuit also has a second output stage including a pnp transistor or a PMOS transistor. An emitter terminal or a source terminal of the second output stage transistor is connected to an output terminal of the reference voltage. The second amplifier circuit further includes a second amplifier stage to control the second output stage for equalizing the reference voltage with the higher limit voltage.

Other features of the disclosure, elements, steps, advantages, and characteristics will be apparent from the following description and the accompanying drawings and the claims.

DETAILED DESCRIPTION OF PREFERRED EMBODIMENTS

Figure 1:
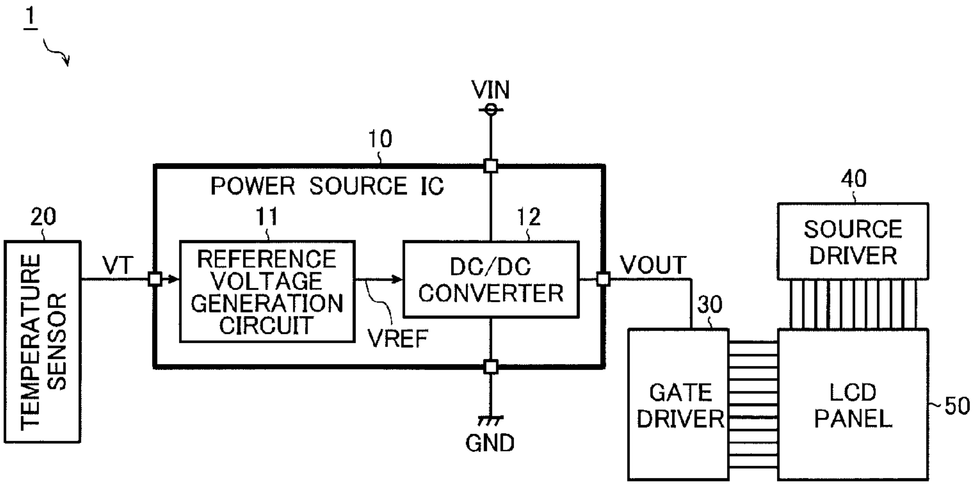
FIG. 1 is a block diagram showing a construction example of a liquid crystal display device in accordance with the disclosure.

FIG. 1 is a block diagram showing a construction example of a liquid crystal display device in accordance with the disclosure. The liquid crystal display device 1 of the disclosure includes a power source IC 10, a temperature sensor 20, a gate driver 30, a source driver 40, and a liquid crystal display panel 50 (LCD[Liquid Crystal Display] panel 50 in the following description).

The power source IC 10 is a semiconductor device to generate an output voltage VOUT from an input voltage VIN, and to supply the output voltage VOUT to the gate driver 30, including a reference voltage generation circuit 11 and a DC/DC converter 12.

The reference voltage generation circuit 11 receives a temperature detection voltage VT (i.e., a voltage signal, the voltage value of which fluctuates in accord to a temperature fluctuation of the LCD panel 50) from the temperature sensor 20, and generates the reference voltage VREF (in reference to FIG. 3) to which a predetermined higher limit voltage VH and a lower limit voltage VL are set. The construction and operation of the reference voltage generation circuit 11 are described below in detail.

The DC/DC converter 12 generates an output voltage VOUT from the input voltage VIN in accord to the reference voltage VREF. In addition, as for the DC/DC converter 12, if the required output voltage VOUT can be generated from the input voltage VIN, any circuit construction (e.g., a switching regulator, a series regulator, a charge pump circuit, and so on) can be adopted.

The temperature sensor 20 is provided around the LCD panel 50, and generates the temperature detection voltage VT, the voltage value of which fluctuates according to a temperature fluctuation of the LCD panel 50. The construction and operation of the temperature sensor 20 are explained below using a particular example.

The gate driver 30 operates by receiving the supplement of the output voltage VOUT from the power source IC 10, and generates a gate drive signal for a TFT transistor (TFT[Thin Film Transistor]) provided to every cell of the LCD panel 50 according to a vertical synchronizing signal provided from a logic part (the logic part is not illustrated). A voltage value of the gate drive signal fluctuates according to an output voltage VOUT.

The source driver 40 generates a source drive signal for a TFT transistor provided to every cell of the LCD panel 50 according to an image signal provided from a logic part (the logic part is not illustrated).

The LCD panel 50 displays an arbitrary character or an image by receiving a gate drive signal and a source drive signal from the gate driver 30 and the source driver 40, respectively.

As described above, with respect to a liquid crystal display device 1 in accordance with an example of the implementation, the power source IC 10 includes a function which performs variable control for voltage value of the output voltage VOUT provided to the gate driver 30 (i.e., Furthermore, a voltage value of the gate drive signal provided to the LCD panel 50) according to an ambient temperature of the LCD panel 50. In other words, the power source IC 10 includes a function for compensating temperature of the LCD panel 50. This construction makes it possible to realize a panel characteristic (e.g., contrast and gamma curve) free from fluctuation of temperature, and to enhance visibility and color reproducibility of the LCD panel 50.

Figure 2:
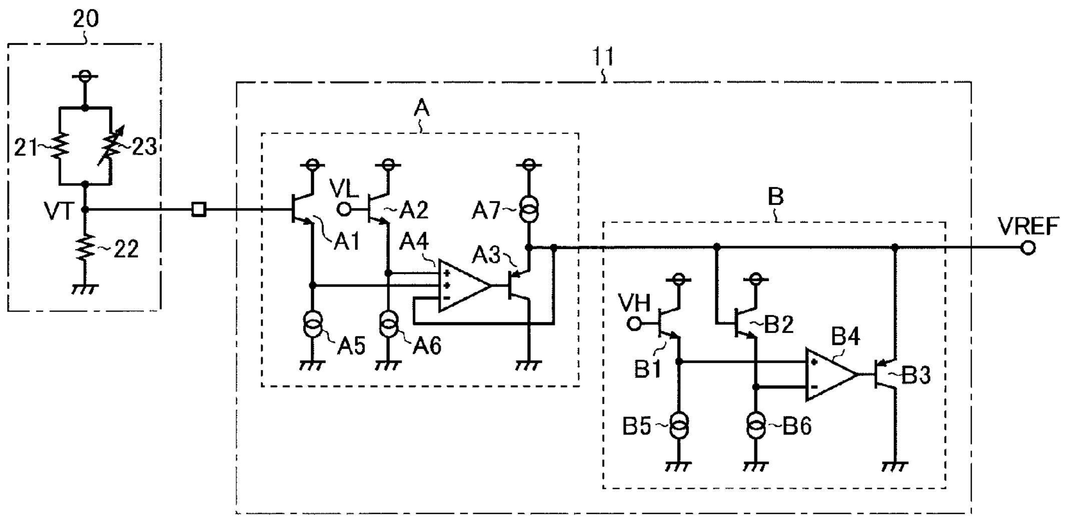
FIG. 2 is a circuit diagram showing a construction example of a reference voltage generation circuit 11 and a temperature sensor 20.

FIG. 2 is a circuit diagram showing a construction example of a reference voltage generation circuit 11 and a temperature sensor 20. The reference voltage generation circuit 11 of the disclosure includes a first amplifier circuit A and a second amplifier circuit B. The first amplifier circuit A includes a npn bipolar transistors A1 and A2, a pnp bipolar transistor A3, an operational amplifier A4, and current sources A5 to A7. The second amplifier circuit B includes npn bipolar transistors B1 and B2, a pnp bipolar transistor B3, an operational amplifier B4, and current sources B5 and B6.

A collector terminal of the transistor A1 is connected to a power source terminal. An emitter terminal of the transistor A1 is connected to a ground terminal via the current source A5. A base terminal of the transistor A1 is connected to an apply terminal of the temperature detection voltage VT. A collector terminal of the transistor A2 is connected to a power source terminal. An emitter terminal of the transistor A2 is connected to the ground terminal via the current source A6. A base terminal of the transistor A2 is connected to a apply terminal of the lower limit voltage VL. A first non-inverting input terminal (+) of the operational amplifier A4 is connected to an emitter terminal of the transistor A1. A second non-inverting input terminal (+) of the operational amplifier A4 is connected to an emitter terminal of the transistor A2. An inverting terminal (−) of the operational amplifier A4 is connected to an output terminal of the reference voltage VREF. An output terminal of the operational amplifier A4 is connected to a base terminal of the transistor A3. An emitter terminal of the transistor A3 is connected to an output terminal of the reference voltage VREF, and also connected to the power source terminal via a current source A7. A collector terminal of the transistor A3 is connected to the ground terminal.

A collector terminal of the transistor B1 is connected to the power source terminal. An emitter terminal of the transistor B1 is connected to the ground terminal via the current source B5. A base terminal of the transistor B1 is connected to an apply terminal of the higher limit voltage VH. A collector terminal of the transistor B2 is connected to the power source terminal. An emitter terminal of the transistor B2 is connected to the ground terminal via the current source B6. A base terminal of the transistor B2 is connected to an output terminal of the reference voltage VREF. A non-inverting input terminal (+) of the operational amplifier B4 is connected to an emitter terminal of the transistor B1. An inverting terminal (−) of the operational amplifier B4 is connected to an emitter terminal of the transistor B2. An output terminal of the operational amplifier B4 is connected to a base terminal of the transistor B3. An emitter terminal of the transistor B3 is connected to an output terminal of the reference voltage VREF. A collector terminal of the transistor B3 is connected to the ground terminal.

As for the first amplifier circuit A of the aforementioned construction, the first input stage is constructed with the transistors A1 and A2, and the current sources A5 and A6. The first output stage is constructed with the transistor A3 and the current source A7. The first amplifier stage for controlling the first output stage (i.e., the transistor A3 in detail) is constructed by the operational amplifier A4 to equalize the higher one of the temperature detection voltage VT and the lower limit voltage VL with the reference voltage VREF.

With respect to the second amplifier circuit B constructed with the aforementioned construction, the second input stage is constructed with transistors B1 and B2, and the current sources B5 to B6. The second output stage is constructed with the transistor B3. The second amplifier stage for controlling the second output stage (i.e., the transistor B3 in detail) to equalize the reference voltage VREF with the higher limit voltage VH is constructed with the operational amplifier B4.

The temperature sensor 20 in accordance with the implementation includes the resistors 21 and 22, and the thermistor 23. The resistor 21 is connected between the power source terminal and an output terminal of the temperature detection voltage VT. The resistor 22 is connected between the ground terminal and an output terminal of the temperature detection voltage VT. The thermistor 23 is connected to the resistor 21 in parallel.

Figure 3:
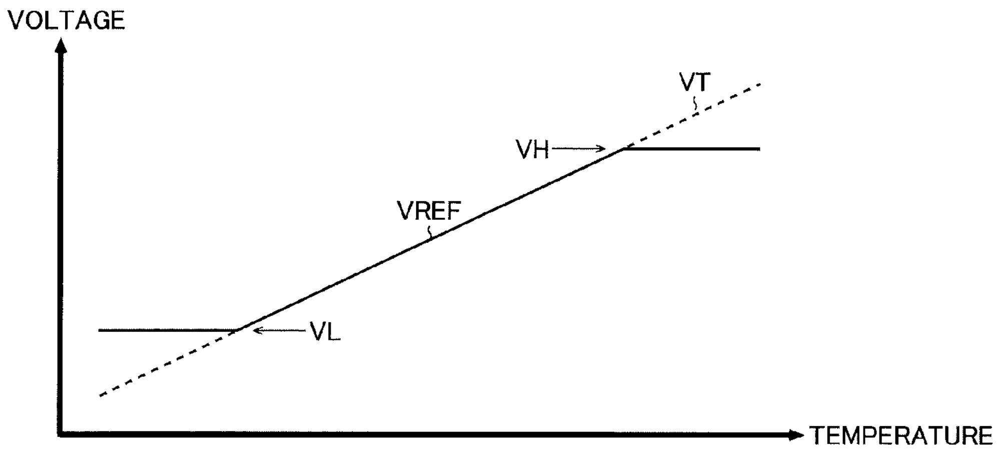
FIG. 3 is a correlation diagram showing a temperature fluctuation and a reference voltage VREF.

As the thermistor 23, so called a NTC (Negative Temperature Coefficient) thermistor is used, the temperature coefficient of which is negative (i.e., the resistance value is lowered as the ambient temperature around the LCD panel 50 increases). Therefore, the higher an ambient temperature around the LCD panel 50 becomes, the lower the synthesized resistance value of the resistor 21 and the thermistor 23 becomes smaller. As the ambient temperature around the LCD panel 50 becomes higher, the higher the voltage value of the temperature detection voltage VT becomes, as shown in FIG. 3.

A detailed explanation is described below about an operation of the reference voltage generation circuit 11 according to the abovementioned construction.

If VL is greater than or equal to VT, in the first amplifier circuit A, a feedback control is performed for the transistor A3 by the operational amplifier A4, to equalize the lower limit voltage VL, which is higher than the temperature detection voltage VT, with the reference voltage VREF. Thus, the first amplifier circuit A preferentially outputs the lower limit voltage VL than the temperature detection voltage VT. On the other hand, in the second amplifier circuit B, a feedback control for the transistor B3 by the operational amplifier B4 is performed, to equalize the reference voltage VREF with the higher limit voltage VH. However, only the capability to extract a current from the output terminal of the reference voltage VREF is provided to the transistor B3 (i.e., a capability to lower a voltage value of the reference voltage VREF not to surpass the higher limit voltage VH). Therefore, if the reference voltage VREF is lower than the higher limit voltage VH, the second amplifier circuit B transitions to a state which does not function at all (i.e., in detail, an output signal of the operational amplifier B4 over swings to a high level, and the transistor B3 is completely turned OFF). According to the aforementioned operation, the reference voltage VREF does not lower the lower limit voltage VL and is kept at a lower limit voltage VL.

If VH is greater than VT, and VT is greater than VL, in the first amplifier circuit A, a feedback control is performed for the transistor A3 by the operational amplifier A4, to equalize the temperature detection voltage VT, which is higher than the lower limit voltage VL, with the reference voltage VREF. Thus, the first amplifier circuit A preferentially outputs a temperature detection voltage VT than the lower limit voltage VL. On the other hand, in the second amplifier circuit B, a feedback control for the transistor B3 by the operational amplifier B4 is performed, to equalize the reference voltage VREF with the higher limit voltage VH. However, only a capability to extract a current from the output terminal of the reference voltage VREF is provided to the transistor B3, if the reference voltage VREF is lower than the higher limit voltage VH, the second amplifier circuit B transitions to a state which does not function at all. According to the aforementioned operation, a voltage value of the reference voltage VREF fluctuates in synchronization with the temperature detection voltage VT.

IF VT is greater than or equal to VH, in the first amplifier circuit A, a feedback control is performed for the transistor A3 by the operational amplifier A4, to equalize the temperature detection voltage VT, which is higher than the lower limit voltage VL, with the reference voltage VREF. Thus, the first amplifier circuit A preferentially outputs the temperature detection voltage VT than the lower limit voltage VL. On the other hand, in the second amplifier circuit B, a feedback control for the transistor B3 by the operational amplifier B4 is performed, to equalize the reference voltage VREF with the higher limit voltage VH. Thus, in the second amplifier circuit B, a current is extracted from the output terminal of the reference voltage VREF via the transistor B3, the reference voltage VREF is lowered to the higher limit voltage VH. At same time, as mentioned above, in the first amplifier circuit A, a feedback control is performed for the transistor A3 by the operational amplifier A4, to equalize the temperature detection voltage VT with the reference voltage VREF. However, only a capability to extract a current from the output terminal of the reference voltage VREF is provided to the transistor A3. Therefore, if the reference voltage VREF is clamped to a higher limit voltage VH lower than the temperature detection voltage VT, the first amplifier circuit A transitions to a state which does not function at all (i.e., in detail, an output signal of the operational amplifier A4 over swings to a high level and the transistor A3 is completely turned OFF). According to the aforementioned operation, a voltage value of the reference voltage VREF is kept at the higher limit voltage VH not to surpass the higher limit voltage VH.

Figure 4:
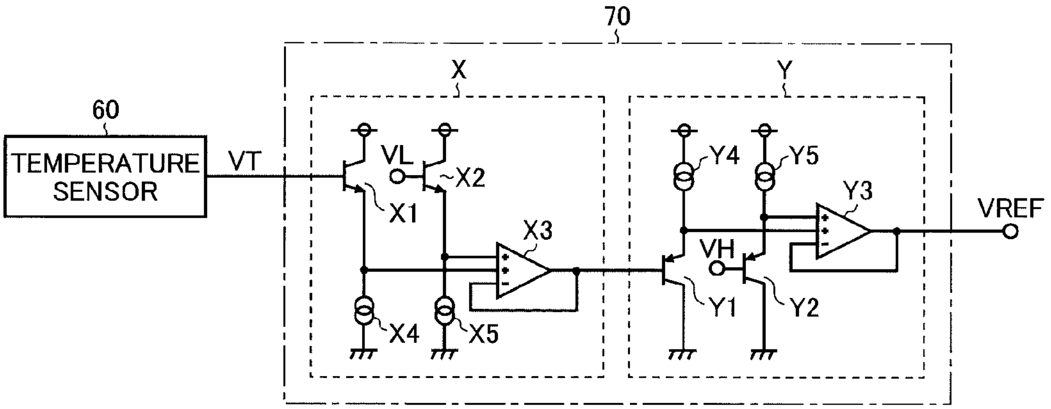
FIG. 4 Related Art
FIG. 4 is a circuit diagram showing a first conventional example of a reference voltage generation circuit.
Figure 5:
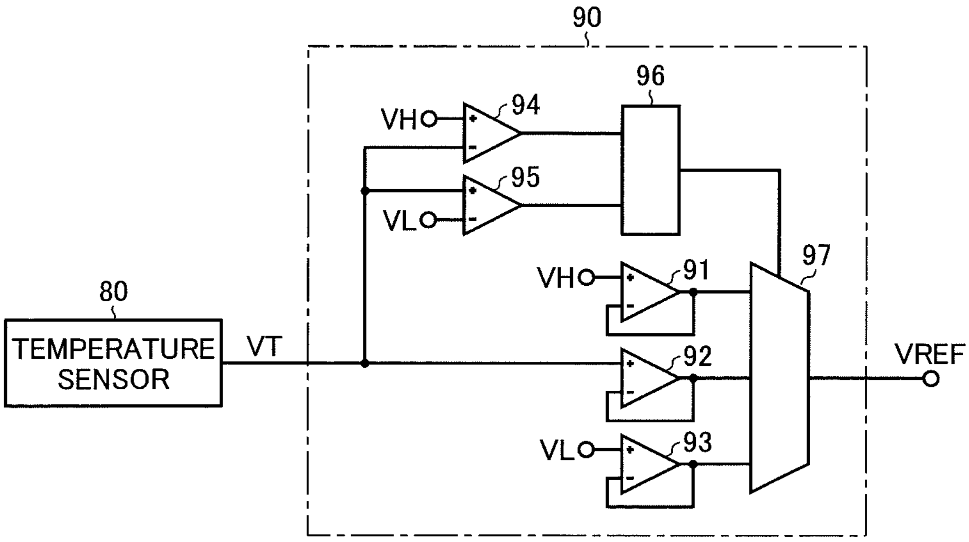
FIG. 5 Related Art
FIG. 5 is a circuit diagram showing a second conventional example of a reference voltage generation circuit.

As described above, the reference voltage generation circuit 11 in accordance with the implementation differs from the conventional construction using the npn-input-type first amplifier circuit X and the pnp-input-type second amplifier circuit Y (in reference to FIG. 4), by using the first amplifier circuit A and the second amplifier circuit B both which include npn-input stage and pnp-output stage, and only have capability of extracting a current, then each output of the amplifier circuits A and B is shorted, and the reference voltage VREF can be generated. Based on this construction, without using the pnp-input-type second amplifier circuit Y (i.e., the pnp transistor Y2, the higher limit voltage VH is inputted to a base terminal of the transistor Y2), the function of clamping the reference voltage VREF to the higher limit voltage VH (i.e., a function to preferentially output the lower voltage between the two inputted voltages) can be realized. Therefore, the minimum operation voltage of the reference voltage generation circuit 11 can be lowered, which makes it possible to contribute to a reduction in energy consumption of the power source IC 10 and the liquid crystal display device 1 using the circuit.

With respect to the aforementioned implementation, as transistors constructing the first amplifier circuit A and the second amplifier circuit B, an example is described in reference a construction which uses bipolar transistors A1 to A3 and B1 to B3. The construction of the disclosure is not restricted to the example, on behalf of a bipolar transistor, a MOS[Metal Oxide Semiconductor] FET [Filed Effect transistor] can be used, for example. In that case, equivalent replacement can be realized by replacing a base terminal, an emitter terminal, and a collector terminal of the bipolar transistor to a gate terminal, a source terminal, and a drain terminal of the MOS FET, respectively.

In the above mentioned implementation, the example is described as applying the reference voltage generation circuit 11 (i.e., the generation circuit 11 generates the reference voltage VREF by setting the higher limit voltage VH and the lower limit voltage to the temperature detection voltage VT)

to the disclosure. However, application of the disclosure is not restricted to the example. The disclosure can be applied flexibly to a general reference voltage generation circuit which generates a reference voltage by setting a higher limit value and a lower limit value to a variable voltage.

As for the reference voltage generation circuit disclosed in the specification, the minimum operation voltage can be lowered, which makes it possible to contribute to a reduction in energy consumption of the power source device and the liquid crystal display device using the circuit.

A technical characteristic disclosed in the specification can possibly be used as a technique to lower a minimum operation voltage of the power source device including a temperature compensation function for the liquid crystal display panel.

In the above description, best mode implementations of the disclosure have been described. Nevertheless, various modifications can be made, and it is evident to a person of ordinary skill that other implementations can be included apart from the aforementioned constructions. Accordingly, any other implementations are within the scope of the claims without departing from the spirit and scope of the disclosure.

List of Reference Numerals

1 liquid crystal display device
10 power source IC
11 reference voltage generation circuit
12 DC/DC converter
20 temperature sensor
21, 22 resistor
23 thermistor
30 gate driver
40 source driver
50 liquid crystal display panel (LCD panel)
A first amplifier circuit
A1, A2 npn type bipolar transistor
A3 pnp type bipolar transistor
A4 operational amplifier (amplifier stage)
A5-A7 current source
B second amplifier circuit
B1, B2 npn type bipolar transistor
B3 pnp type bipolar transistor
B4 operational amplifier (amplifier stage)
B5, B6 current source

What is claimed is:

1. A reference voltage generation circuit comprising:
a first amplifier circuit; and
a second amplifier circuit;
wherein the first amplifier circuit comprises:
a first input stage including two npn transistors or NMOS transistors having base terminals or gate terminals to which a variable voltage and a predetermined lower limit voltage are inputted, respectively;
a first output stage including a pnp transistor or a PMOS transistor having an emitter terminal or a source terminal connected to an output terminal for a reference voltage; and
a first amplifier stage to control the first output stage for equalizing the higher one of the variable voltage and the lower limit voltage with the reference voltage;
wherein the second amplifier circuit comprises:
a second input stage including two npn transistors or two NMOS transistors having base terminals or gate terminals to which the reference voltage and a predetermined higher limit voltage are inputted, respectively;
a second output stage including a pnp transistor or a PMOS transistor having an emitter terminal or a source terminal connected to an output terminal for the reference voltage; and
a second amplifier stage to control the second output stage for equalizing the reference voltage with the higher limit voltage.

2. The reference voltage generation circuit according to claim 1, wherein the first output stage includes a current source connected between the power source terminal and an output terminal for the reference voltage.

3. The reference voltage generation circuit according to claim 1, wherein each of the first input stage and the second input stage includes a current source connected between each emitter terminal of the npn transistors and each ground terminal or a current source connected between each source terminal of the NMOS transistors and each ground terminal, respectively.

4. The reference voltage generation circuit according to claim 1,
wherein the first amplifier stage comprises a first operational amplifier having a first non-inverting input terminal and a second non-inverting input terminal each of which is connected to each emitter terminal of the two npn transistors or connected to each source terminal of the two NMOS transistors included in the first input stage, the first operational amplifier having an inverting input terminal connected to an output terminal for the reference voltage, and the first operational amplifier having an output terminal connected to the base terminal of the pnp transistor or the gate terminal of the PMOS transistor included in the first output stage,
wherein the second amplifier stage comprises a second operational amplifier having a non-inverting input terminal and an inverting input terminal connected to an emitter terminal of the two npn transistors or connected to a source terminal of the two NMOS transistors included in the second input stage, the second operational amplifier having an output terminal connected to the base terminal of the pnp transistor or connected to a gate terminal of the PMOS transistor included in the second output stage.

5. The reference voltage generation circuit according to claim 1, wherein the variable voltage is a temperature detection voltage, a voltage value of which fluctuates according to fluctuation of temperature.

6. A power source device comprising:
a reference voltage generation circuit to generate a reference voltage; and
a DC/DC converter to generate an output voltage from an input voltage according to the reference voltage;
wherein the reference voltage generation circuit comprises:
a first input stage including two npn transistors or two NMOS transistors having base terminals or gate terminals to which a variable voltage and a predetermined lower limit voltage are inputted, respectively;
a first output stage including a pnp transistor or a PMOS transistor having an emitter terminal or a source terminal connected to an output terminal for the reference voltage; and
a first amplifier stage to control the first output stage for equalizing the higher one of the variable voltage and the lower limit voltage with the reference voltage;
wherein the second amplifier circuit comprises:
a second input stage including two npn transistors or two NMOS transistors having base terminals or gate terminals to which the reference voltage and a predetermined higher limit voltage are inputted, respectively;

a second output stage including a pnp transistor or a PMOS transistor having an emitter terminal or a source terminal connected to an output terminal of the reference voltage; and a second amplifier stage to control the second output stage for equalizing the reference voltage with the higher limit voltage.

7. The power source device according to claim 6, wherein the first output stage comprising a current source connected between a power source terminal and an output terminal for the reference voltage.

8. The power source device according to claim 6, wherein each of the first input stage and the second input stage includes current sources connected between each emitter terminal of the npn transistors and each ground terminal or current sources connected between each source terminal of the NMOS transistors and each ground terminal, respectively.

9. The power source device according to claim 6, wherein the first amplifier stage comprises a first operational amplifier having a first non-inverting input terminal and a second non-inverting input terminal each of which is connected to each emitter terminal of the two npn transistors or connected to each source terminal of the two NMOS transistors included in the first input stage, the first operational amplifier having an inverting input terminal connected to an output terminal for the reference voltage, and the first operational amplifier having an output terminal connected to the base terminal of the pnp transistor or the gate terminal of the PMOS transistor included in the first output stage, wherein the second amplifier stage comprises a second operational amplifier having a non-inverting input terminal and an inverting input terminal each of which is connected to an emitter terminal of the two npn transistors or connected to a source terminal of the two NMOS transistors included in the second input stage, and the second operational amplifier having an output terminal which is connected to the base terminal of the pnp transistor or connected to a gate terminal of the PMOS transistor included in the second output stage.

10. The power source device according to claim 6, wherein the variable voltage is a temperature detection voltage, a voltage value of which fluctuates according to fluctuation of temperature.

11. A liquid crystal display device comprising:

a temperature sensor which generates a temperature detection voltage, a voltage value of which fluctuates according to fluctuation of temperature;

a power source device to generate an output voltage from an input voltage according to a reference voltage;

a gate driver to generate a gate drive signal in response to a supplement of the output voltage;

a source driver to generate a source drive signal; and a liquid crystal display panel which operates by receiving the gate drive signal and the source drive signal;

wherein the power source device comprises:

a reference voltage generation circuit to generate the reference voltage;

a DC/DC converter to generate an output voltage from an input voltage according to the reference voltage;

wherein the reference voltage generation circuit comprises:

a first amplifier circuit; and a second amplifier circuit;

wherein the first amplifier circuit comprises:

a first input stage including two npn transistors or two NMOS transistors having base terminals or gate terminals to which the temperature detection voltage and a predetermined lower limit voltage are inputted, respectively;

a first output stage including a pnp transistor or a PMOS transistor having an emitter terminal or a source terminal connected to an output terminal for the reference voltage;

a first amplifier stage to control the first output stage for equalizing the higher one of the temperature detection voltage and the lower limit voltage with the reference voltage;

wherein the second amplifier circuit comprises:

a second input stage including two npn transistors or two NMOS transistors having base terminals or gate terminals to which the reference voltage and a predetermined higher limit voltage are inputted, respectively;

a second output stage including a pnp transistor or a PMOS transistor having an emitter terminal or a source terminal connected to an output terminal for the reference voltage;

a second amplifier to control the second output stage for equalizing the reference voltage and the higher limit voltage.

12. The liquid crystal display device according to claim 11, wherein the first output stage includes a current source connected between a power source terminal and an output terminal for the reference voltage.

13. The liquid crystal display device according to claim 11, wherein each of the first input stage and the second input stage includes current sources connected between each emitter terminal of the npn transistors and each ground terminal or current sources connected between each source terminal of the NMOS transistors and each ground terminal, respectively.

14. The liquid crystal display device according to claim 11, wherein the first amplifier stage comprises a first operational amplifier having a first non-inverting input terminal and a second non-inverting input terminal each of which is connected to each emitter terminal of the two npn transistors or connected to each source terminal of the two NMOS transistors included in the first input stage, the first operational amplifier having an inverting input terminal connected to an output terminal of the reference voltage, and the first operational amplifier having an output terminal connected to the base terminal of the pnp transistor or the gate terminal of the PMOS transistor included in the first output stage, wherein the second amplifier stage comprises a second operational amplifier having a non-inverting input terminal and an inverting input terminal each of which is connected to an emitter terminal of the two npn transistors or connected to a source terminal of the two NMOS transistor included in the second input stage, and the second operational amplifier having an output terminal connected to the base terminal of the pnp transistor or connected to a gate terminal of the PMOS transistor included in the second output stage.

15. A liquid crystal display device according to claim 11, wherein the temperature sensor generates the temperature detection voltage according to an ambient temperature of the liquid crystal display panel.

16. The liquid crystal display device according to claim 15, wherein the temperature sensor comprises:

a first resistor connected between the power source terminal and an output terminal of the temperature detection voltage;

a second resistor connected between the ground terminal and an output terminal of the temperature detection voltage; and a thermistor connected to the first resistor in parallel.

17. The liquid crystal display device according to the claim 16, wherein the thermistor has a negative temperature coefficient which lowers a resistance value if the temperature rises.

* * * * *